(12) United States Patent
Azar et al.

(10) Patent No.: US 12,345,236 B2
(45) Date of Patent: Jul. 1, 2025

(54) METHOD FOR COMPUTER-IMPLEMENTED DETERMINATION OF CONTROL PARAMETERS OF A TURBINE

(71) Applicant: Siemens Gamesa Renewable Energy A/S, Brande (DK)

(72) Inventors: Ziad Azar, Sheffield (GB); Richard Clark, Sheffield (GB); Alexander Duke, Sheffield (GB); Arwyn Thomas, Breaston (GB); Zhan-Yuan Wu, Sheffield (GB)

(73) Assignee: Siemens Gamesa Renewable Energy A/S, Brande (DK)

(*) Notice: Subject to any disclaimer, the term of this patent is extended or adjusted under 35 U.S.C. 154(b) by 562 days.

(21) Appl. No.: 17/632,799

(22) PCT Filed: Jul. 24, 2020

(86) PCT No.: PCT/EP2020/071003
§ 371 (c)(1),
(2) Date: Feb. 4, 2022

(87) PCT Pub. No.: WO2021/028199
PCT Pub. Date: Feb. 18, 2021

(65) Prior Publication Data
US 2022/0290651 A1  Sep. 15, 2022

(30) Foreign Application Priority Data
Aug. 14, 2019 (EP) ..................... 19191776

(51) Int. Cl.
*F03D 7/04* (2006.01)
*F03D 7/02* (2006.01)

(52) U.S. Cl.
CPC ........... *F03D 7/045* (2013.01); *F03D 7/0288* (2013.01); *F05B 2260/84* (2013.01);
(Continued)

(58) Field of Classification Search
CPC ........ F03D 7/045; F03D 7/0288; F03D 15/20; F05B 2260/84; F05B 2270/1091;
(Continued)

(56) References Cited

U.S. PATENT DOCUMENTS

2006/0113801 A1* 6/2006 Schubert ................ G05B 17/02
                                                                290/44
2008/0010036 A1* 1/2008 Swahn ..................... H02P 23/14
                                                                702/132

(Continued)

FOREIGN PATENT DOCUMENTS

CN        101813054 A        8/2010
CN        107810324 A        3/2018
(Continued)

OTHER PUBLICATIONS

International Search Report & Written Opinion for PCT/EP2020/071003 issued Oct. 16, 2020.

*Primary Examiner* — Kamini S Shah
*Assistant Examiner* — Jonathan Michael Skrzycki
(74) *Attorney, Agent, or Firm* — Schmeiser, Olsen & Watts LLP

(57) ABSTRACT

A method for determining control parameters of a turbine by consideration of component-relevant temperature limits is provided. The method considers the impact of individual turbine manufacturing tolerances on the turbine performance in a turbine model to determine control parameters for the turbine without damaging it. The method includes the steps of: receiving, by an interface, one or more measurement values of turbine sensors; determining, by a processing unit, at components or turbine places being equipped or not with turbine sensors, one or more virtual parameters and/or temperatures by a simulation of the operation of the turbine, the simulation being made with a given turbine model in which the one or more measurement values and one or more (Continued)

characteristic values of the wind turbine are used as input parameters; and deriving, by the processing unit, the control parameters for the wind turbine from the one or more virtual parameters and/or temperatures.

16 Claims, 4 Drawing Sheets

(52) U.S. Cl.
CPC ............... *F05B 2270/1091* (2013.01); *F05B 2270/3032* (2013.01); *F05B 2270/305* (2013.01); *F05B 2270/70* (2013.01)

(58) Field of Classification Search
CPC ........ F05B 2270/3032; F05B 2270/305; F05B 2270/70; F05B 2260/821; F05B 2270/802; G05B 2219/2619; G05B 13/042; Y02E 10/72; F02C 9/00; F05D 2270/71; Y02P 70/50

See application file for complete search history.

(56) References Cited

U.S. PATENT DOCUMENTS

| | | | |
|---|---|---|---|
| 2010/0140936 A1 | 6/2010 | Benito et al. | |
| 2010/0270798 A1* | 10/2010 | Poulsen | H02P 9/14 |
| | | | 290/44 |
| 2012/0027566 A1 | 2/2012 | Boerlage et al. | |
| 2012/0029892 A1* | 2/2012 | Thulke | F03D 7/045 |
| | | | 703/7 |
| 2013/0136595 A1* | 5/2013 | Laurberg | F03D 7/00 |
| | | | 416/1 |
| 2015/0227659 A1* | 8/2015 | Andersson | G07C 5/085 |
| | | | 703/2 |
| 2015/0322926 A1 | 11/2015 | Caponetti et al. | |
| 2016/0333855 A1* | 11/2016 | Lund | G05B 13/041 |
| 2018/0142674 A1 | 5/2018 | Hammerum et al. | |
| 2018/0180025 A1 | 6/2018 | Spruce et al. | |
| 2019/0010922 A1* | 1/2019 | Baba | F03D 7/0272 |
| 2019/0113025 A1* | 4/2019 | Badger | F03D 80/40 |
| 2019/0195189 A1 | 6/2019 | Echenique Subiabre | |
| 2019/0390655 A1* | 12/2019 | Garry | F03D 17/00 |

FOREIGN PATENT DOCUMENTS

| | | |
|---|---|---|
| EP | 1 930 855 A2 | 6/2008 |
| EP | 2 538 074 A2 | 12/2012 |

\* cited by examiner

METHOD FOR COMPUTER-IMPLEMENTED DETERMINATION OF CONTROL PARAMETERS OF A TURBINE

CROSS-REFERENCE TO RELATED APPLICATIONS

This application claims priority to PCT Application No. PCT/EP2020/071003, having a filing date of Jul. 24, 2020, which claims priority to EP Application No. 19191776.4, having a filing date of Aug. 14, 2019, the entire contents both of which are hereby incorporated by reference.

FIELD OF TECHNOLOGY

The following relates to a method and a system for computer-implemented determination of control parameters of a turbine.

BACKGROUND

The operation of wind turbines is based on nominal characteristic values of the wind turbine which characterize the wind turbines in terms of power output in dependency of wind speed. Using nominal parameters enables the manufacturer of the wind turbine to guarantee specific annual energy production (AEP) to customers as the wind turbines are treated as having identical performance at its contractual rated point.

The nominal parameters therefore are used as a basis to derive turbine control parameters (short: control parameters) regarding a specific power output at a specific ambient condition, in particular wind speed. It is known that many components in a wind turbine are sensitive to temperature. As an example, the performance of permanent magnets in Direct Drive (DD) wind turbines, in terms of remanence and coercivity, reversibly reduces as temperature increases, which reduces torque and power and reduces the margins provided for demagnetization withstand under fault conditions. The operating temperature is a function of both the ambient air temperature and losses (e.g., copper loss, iron loss, self-heating due to magnet eddy currents). As a further example, the lifetime of insulations may be affected by temperature.

It is therefore essential to monitor the temperatures of sensitive components during operation. However, it is extremely costly and complex and sometimes even not possible to fully instrument the critical components. Monitoring of the rotor and magnet temperatures is challenging as most sensors would require either an electrical connection via slip-rings thereby affecting reliability and challenging on a large diameter and shaftless machine like a wind turbine, or wireless telemetry which increases complexity and cost and may also be challenging due to an electrically noisy environment (e.g., pulse-width-modulation fed windings).

As certain temperatures such as rotor magnet temperature are not readily available, the wind turbine is operated with suitable safety margins resulting in a loss of annual energy production (AEP). Alternatively, the wind turbine can be over engineered, i.e., a higher temperature grade of magnet may need to be used due to uncertainty of magnet temperatures. This alternative results in higher costs.

The same problems arise in other industrial processes, such as the operation of gas turbines.

SUMMARY

An aspect relates to a computer-implemented method and a system which allow an operation of a turbine with high power production while being protected at the same time. It is a further aspect to provide a computer program product.

According to a first aspect of embodiments of the present invention, a method for computer-implemented determination of control parameters of a turbine is suggested. The turbine may be a single wind turbine. The turbine may be a wind turbine of a wind park. In case the turbine is a wind turbine it comprises a generator. Alternatively, the turbine may be a gas turbine having a generator.

The method comprises the step of receiving, by an interface, one or more measurement values of turbine sensors. According to the number of turbine sensors spread over the turbine, a corresponding number of measurement values are provided. It is to be understood that the number of turbine sensors is acquiring measurement values in predefined time intervals, resulting in a data stream of measurement values received by the interface.

The method comprises as a further step, determining, by a processing unit, at components or turbine places being equipped or not with turbine sensors, one or more virtual parameters and/or temperatures by a simulation of the operation of the turbine, the simulation being made with a given turbine model in which the one or more measurement values and one and more characteristic values of the turbine are used as input parameters.

The method comprises as a last step, deriving, by the processing unit, the control parameters for the turbine from the one or more virtual parameters and/or temperatures.

Virtual parameters in the context of embodiments of the present invention may be, for example, at least one of temperature, noise, vibrations, component stress and component strain.

By using a turbine model, which is a validated physical model coupled with nominal and/or measured manufacturing parameters, in conjunction with a (small) number of measured performance parameters in form of easier to measure measurement values, other parameters and/or temperatures can be predicted and/or estimated. This can be used, for example, to determine parameters of rotating components (e.g., magnets in a rotor of a motor or generator). The use of a (small) number of sensors can then be employed to confidently estimate the parameters and/or temperatures throughout the turbine with a high fidelity which is determined by the turbine model fidelity rather than the number of sensors. This knowledge is used to operate the turbine closer to its potential thermal limits and therefore maintain high levels of AEP even if carrying certain faults, e.g., a cooling fan out of operation.

Use of a turbine model which is bespoke to each turbine by using nominal and/or manufacturing data along with a number of readily measurable parameters, in particular temperatures, is used to predict a parameter and/or temperature of hard to reach/instrument components, thereby avoiding complex and costly sensors, such as slip-rings to carry signals from rotating components to a static frame or telemetry or Wi-Fi. As a result, the suggested procedure enables decreasing the number of sensors to be installed at the turbine.

Considering suitable characteristic values for the turbine enables forming a tailored turbine "DNA" which can be regarded as a unique map of characterizing turbine parameters. Having knowledge about manufacturing tolerances of the turbine, a given turbine model can be fed with the characteristic values to determine whether the turbine is able to still produce power without getting damaged. In case of a wind turbine, the determination how much power can be generated according to the predicted and/or estimated parameters and/or temperatures can be derived from an associated power versus wind speed map which can be derived from the output of the given turbine model, and which processes the one or more characteristic values of the wind turbine as input parameters in addition to the measurement values.

Hence, the characteristic values are considered in a turbine model to derive actual and turbine specific control parameters. This mechanism on power maximization by using the given turbine model does not have negative impact to the existing turbine structure, such as generator, power converter and blades, etc. as their operation is considering nominal and/or actual characteristic values and functionality of turbine components.

According to an embodiment, the turbine model is a physical model which is based on a number of equations found by simulations and/or validated test data and/or look-up tables. The turbine model may, in addition, consider a number of measured performance parameters, such as temperatures, current load profile, etc. to determine, in case of a wind turbine, the power versus wind speed map for a specific wind turbine.

The one or more characteristic values may be retrieved and received, by the interface, from a database. The interface and the processing unit are part of a computer system. The computer system may be part of a controlling instance of the wind turbine. Alternatively, the computer system may be part of an external controlling system. The database may be stored on that computer system or may be an external database connected to the computer system. The one or more characteristic values consist nominal parameters of the characteristic values (i.e., nominal characteristic values) and/or achieved or actual values of within manufacturing tolerance bands of the characteristic values (i.e., actual characteristic values) obtained by measurement during the manufacturing process and collated, for a plurality of turbines, in the database.

The one or more characteristic values include one or more of: an airgap (between a rotor and a stator), a magnet performance, a magnet dimension, a thermal conductivity and a coil resistance. In addition to the characteristic values, further characteristic values may be considered as well, such as variations of stator segments and so on.

According to an embodiment, the one or more measurement values consist of a coil temperature and/or an ambient temperature and/or a current load profile. From these easy to measure values other parameters and/or temperatures can be predicted and/or estimated. The turbine model may consider time constants for considering a thermal spread from the place of one or more temperature sensors to the component or turbine components for which the virtual temperature is to be determined. In addition, the turbine model may be based on a heuristic approach due to various time constants of the components to be monitored. Due to that time-based calculation the turbine model may be continually updated. This enables the consideration of reaction times which sometimes can be very long depending on materials and/or form of the components, e.g., large thermal mass.

According to an embodiment, as further input parameters of the turbine model historical turbine sensor data and/or historical operating conditions may be processed for determining, by the processing unit, for the turbine, the virtual parameters and/or temperatures. Considering historical sensor data captured by physical and/or virtual sensors enables to receive information about the behavior of components with respect to current power output and lifetime considerations. Historical sensor data to be considered may consist of component temperatures, ambient temperatures, wind speed, among others. The historical data may be compared with real-time sensor data during the past operation of the turbine. The parameters and/or temperatures predicted by the model at locations that are equipped with sensors can also be compared with the actual measured values to act as a health monitor and indicate potential issues within the generator/turbine/sensors. A comparison of measured lifetime data with those resulting from the turbine model allows for a flexible exploitation of generous manufacturing margins to maximize, in case of a wind turbine, AEP according to a current operation situation.

According to an embodiment, the turbine model considers a drive train consisting or comprising of a rotor hub, a generator and a converter, of the wind turbine. In case of a gas turbine, the turbine model considers a drive train consisting of a rotor hub, a generator and a converter. In addition, or alternatively, the turbine model may consider blades and/or gearbox and/or nacelle and/or tower and/or cable and/or a transformer of the wind turbine.

While the method described above can be used to determine virtual parameters and/or temperatures of an electrical drive train of the wind turbine, the method may also be used to monitor components of a converter of the wind turbine to predict and/or estimate semiconductor temperatures based on heat sink coolant temperature inputs, semiconductor manufacturing data and electrical signals.

According to a second aspect of embodiments of the present invention, a computer program product (non-transitory computer readable storage medium having instructions, which when executed by a processor, perform actions) directly loadable into the internal memory of a digital computer is suggested, comprising software code portions for performing the steps of the method described herein when the product is run on a computer. The computer program product may be in the form of a storage medium, such as a CD-ROM, DVD, USB-stick or a memory card. The computer program product may also be in the form of a signal which is transferable via a wired or wireless communication line.

According to a third aspect, a system for computer-implemented determination of control parameters of a turbine is suggested. The turbine may be a single wind turbine or a wind turbine of a wind park having a generator or a gas turbine having a generator. The system comprises an interface which is adapted to receive one or more measurement values of turbine sensors, and a processing unit which is adapted to determine at components or turbine places being equipped or not with turbine sensors, one or more virtual parameters and/or temperatures by a simulation of the operation of the wind turbine, the simulation being made with a given turbine model in which the one or more measurement values and one or more characteristic values of the wind turbine are used as input parameters and to derive the control parameters for the wind turbine from the one or more virtual temperatures.

BRIEF DESCRIPTION

Some of the embodiments will be described in detail, with reference to the following figures, wherein like designations denote like members, wherein.

In the following section, an example of embodiments of the invention will be described by referring to a wind turbine. As will be understood by the skilled person, the method can be used in other industrial applications as well, in particular in the field of gas turbines.

DETAILED DESCRIPTION

It is known that many components in a wind turbine are sensitive to temperature, either with respect to power output or lifetime. For example, the performance of permanent magnets reversibly reduces as temperature increases, which reduces torque and power and reduces the margins provided for demagnetization withstand under fault conditions. The operating temperature of a wind turbine is a function of both the ambient air temperature and losses (e.g., copper loss, iron loss, self-heating due to magnet eddy currents). As a further example, the lifetime of insulations may be affected by temperature.

It is therefore essential to monitor the temperatures of sensitive components during operation. To avoid costs and complexity to fully instrument the critical components, it is suggested to monitor them by virtual temperatures which are predicted and/or estimated with a validated physical model in conjunction with a limited number of measured performance parameters of easier to measure coil temperatures, ambient temperatures and current load profile.

The below described method enables a computer system to find a trade-off between minimizing the risk of damaging the wind turbine due to its thermal load and maximizing AEP.

Figure 1:
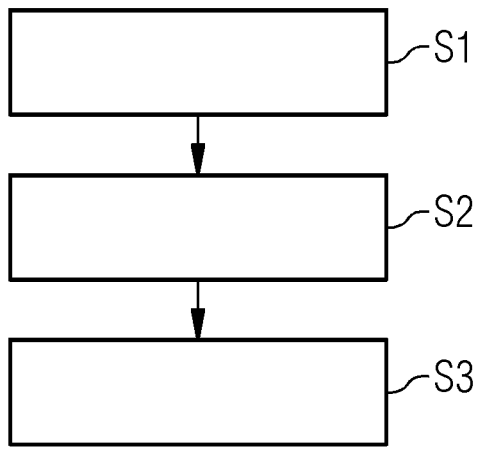
FIG. 1 shows a flow chart illustrating the steps of the method according to embodiments of the present invention.
Figure 2:
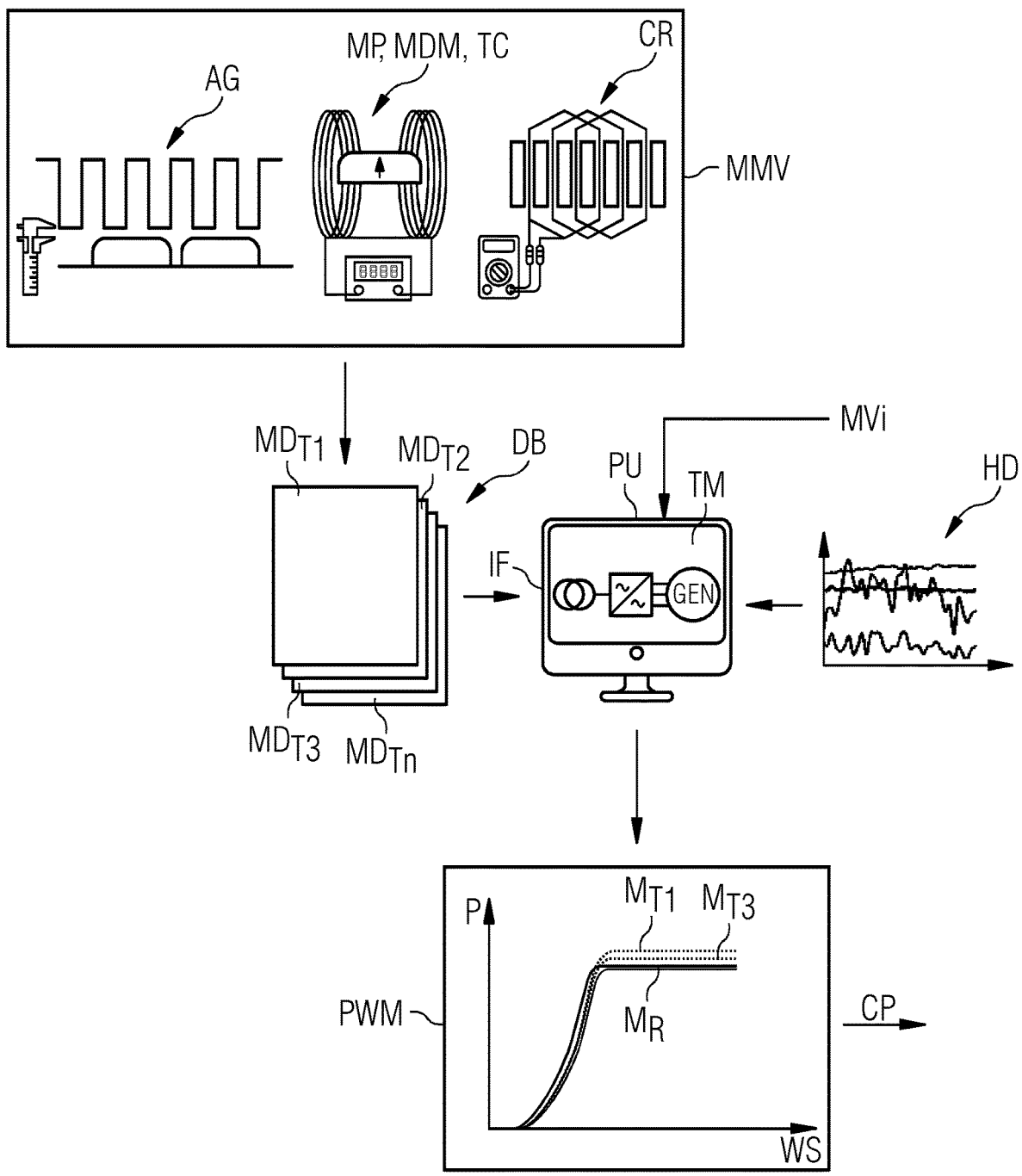
FIG. 2 shows a schematic diagram illustrating the steps for carrying out the method for determination of control parameters of a wind turbine.

Referring to FIG. 1, in step S1 one or more measurement values of turbine sensors are received by an interface IF of a processing unit PU (FIG. 2). According to the number of turbine sensors spread over the wind turbine, a corresponding number of measurement values is provided. As mentioned above, measurement values may be, for example, coil temperatures, ambient temperatures and current load profile. It is to be understood that the number of turbine sensors is acquiring measurement values in predefined time intervals, resulting in a data stream of the measurement values received by the interface IF.

In step S2, the processing unit PU identifies, at components or turbine places being equipped or not with turbine sensors, one or more virtual parameters and/or temperatures by a simulation of the operation of the wind turbine, the simulation being made with a given turbine model in which the one or more measurement values and one or more characteristic values of the wind turbine are used as input parameters. The simulation is made with a given turbine model in which spread of temperature based on the measurement values is modelled. In addition, one or more manufacturing tolerances of characteristic values for the wind turbine are used as input parameter.

In step S3, control parameters CP for the wind turbine are derived from the one or more virtual parameters and/or temperatures.

The turbine model may use a heuristic approach due to various time constants of the components and so the turbine model may be continually updated. In addition, the turbine model allows for error checking against measured parameters.

The possibility to use a small number of sensors (which might be low-cost sensors) only enables to confidently estimate the parameters and/or temperatures throughout the wind turbine and its generator, respectively, with a high fidelity (determined by the model fidelity rather than the number of sensors). The parameters and/or temperatures found by the turbine model will be used to operate the wind turbine closer to potential thermal limits and therefore maintain high levels of AEP even if carrying certain faults, such as an operation with a cooling fan out of operation.

Although above-described procedure has been described by a determination of temperatures of the wind turbine it is to be understood, that other parameters can be predicted and/or estimated using the turbine model alternatively or additionally. Examples for such parameters are noise and vibrations as well as component stress and/or strain.

Although the description is related to a wind turbine in general, the described method can be used to model, in particular, the behavior of its generator. Other applications might include the use of a component level model of the converter, which can estimate semiconductor temperatures based on heat sink coolant temperature inputs, semiconductor manufacturing data and electrical signals.

The method and the turbine model, respectively, consider the impact of individual turbine manufacturing tolerances on the turbine performance, thereby allowing the prediction and/or estimation of parameters and/or temperatures of the wind turbine. Due to the consideration of individual turbine manufacturing tolerances, the wind turbine can be operated in an optimized manner resulting in a maximized AEP. However, it is to be understood the turbine model can be fed with nominal characteristic values as well. In a further implementation, both nominal characteristic values and actual characteristic values considering the manufacturing tolerances may be used as input information in the turbine model.

Referring to FIG. 2, in a first or preparing step, measurement of manufacturing data MMV is executed. Manufacturing tolerances having an impact on the turbine performance are, for example, an airgap AG, a magnet performance MP (as a result of the magnet material and/or dimensions MDM and/or manufacturing processes), thermal conductivity TC, and coil resistance CR. Each of these manufacturing tolerances are characteristic values which are individual for each turbine to be considered. The manufacturing tolerances of these characteristic values AG, MP, MDM, TC, CR do have an immediate impact on the turbine performance, both in normal operation without any issues and during operation when an issue has occurred.

The manufacturing tolerances, typically different for every turbine (turbine DNA), of the characteristic values AG, MP, MDM, TC, CR are collated and stored in a database DB. For each turbine T1, . . . , Tn (where n corresponds to the number of wind turbines in a wind park WP with n≥1), a manufacturing dataset $MD_{T1}, \ldots, MD_{Tn}$ may be stored containing the characteristic values AG, MP, MDM, TC, CR. The manufacturing dataset $MD_{T1}, \ldots, MD_{Tn}$ may be regarded as DNA of each individual wind turbine T1, . . . , Tn. It is to be understood that storing of manufacturing data consisting of the manufacturing tolerances of characteristic values AG, MP, MDM, TC, CR may be made in any way, such as a lookup-table, associated maps, etc.

The manufacturing tolerances of the characteristic values AG, MP, MDM, TC, CR are received at the interface IF of a computer or computer system. The computer or computer system comprises the processing unit PU. The database DB may be stored in a memory of the computer (system) or an external storage of the computer (system). The database DB may be cloud based in another implementation. The processing unit PU is adapted to determine, for each of the number of wind turbines T1, . . . , Tn, a power versus wind speed map $M_{T1}$, . . . , $M_{Tn}$. The power versus wind speed map $M_{T1}$, . . . , $M_{Tn}$ is calculated from the above mentioned given turbine model TM with the actual characteristic values AG, MP, MDM, TC, CR considering manufacturing tolerances of the respective wind turbines T1, . . . , Tn and/or actual characteristic values AG, MP, MDM, TC, CR and the one or more measurement values MVi of turbine sensors (where i corresponds to the number of turbine sensors), as input parameters.

For each type of wind turbine, a specific turbine model may be provided. In an alternative embodiment, a specific turbine model may be used for a respective wind turbine of the wind park. In a further alternative embodiment, a common turbine model may be used for all wind turbines of the wind park.

The turbine model is a physical model which is based on a number of equations found by simulations and/or validated test data. The turbine model can be regarded as a "digital twin" for each individual wind turbine. The power versus wind speed maps $M_{T1}$, . . . , $M_{Tn}$ of each individual wind turbine T1, . . . , Tn are unique maps resulting from the turbine model and the nominal and/or characteristic values AG, MP, MDM, TC, CR as well as the one or more measurement values MVi of turbine sensors. They are created for the turbines having no malfunctions. In addition, additional maps for each turbine may be created for all possible malfunctions. These maps may be created in advance, i.e., before a respective issue is determined. Alternatively, these maps may be created upon receiving information indicating a component malfunction.

Figure 3:
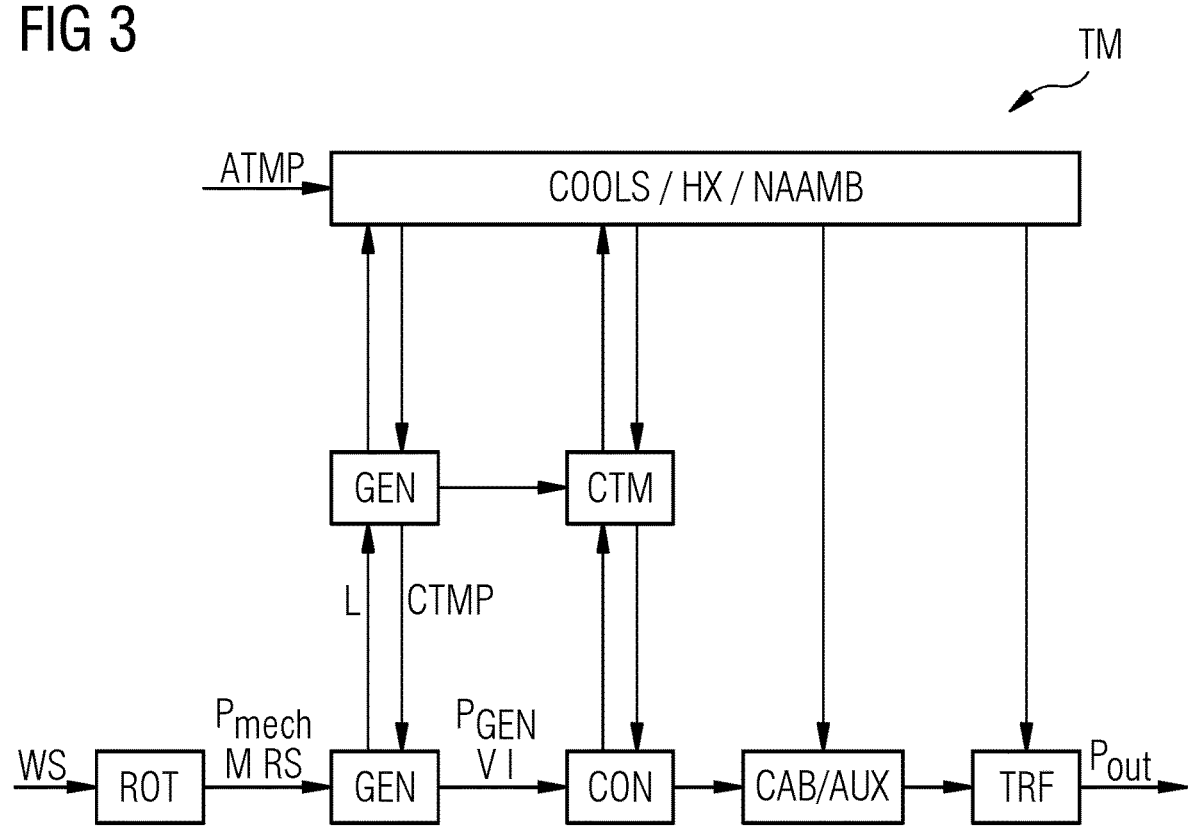
FIG. 3 illustrates a schematic diagram illustrating a turbine model which is used to determine improved control parameters of a wind turbine.

FIG. 3 illustrates an embodiment of the turbine model used to model an individual wind turbine. In this embodiment, the turbine model TM considers an electrical drive train of the wind turbines consisting of a rotor hub ROT, a generator GEN, a converter CON, cables CAB and auxiliary/ancillary components AUX, and a transformer TRF. However, the turbine model TM can also consider further components of the wind turbine, such as blades, nacelle, tower, sub-stations, gearbox (for geared-drive turbine) and so on.

The turbine model TM calculates the losses of components within the drive train to account for the loss in power/energy between the turbine blade input and the output to grid during the electromechanical energy conversion and ancillary or supporting systems. As the loss mechanisms are temperature dependent and themselves generate heat, the turbine model TM is coupled or includes a thermal model for the generator GEN (generator thermal model GTM) and/or a thermal model for the converter CON (converter thermal model CTM) and is solved iteratively. The generator thermal model GTM and the converter thermal model CTM are coupled to components affecting the cooling of the drive train, such as cooling system COOLS (e.g., cooling fans), heat exchanger HX, and nacelle ambient NAAMB.

The turbine model TM calculates the available power Pout at the (grid) output based on the input ambient conditions of wind speed WS and temperature ATMP. The turbine model TM can be used to assess the potential AEP for a given wind turbine and site by inputting historical and/or predicted wind conditions over a given period of time. The use of the thermal models GTM, CTM allows for any control features such as high temperature curtailment to be accounted for accurately. Alternatively, the turbine model TM can be employed in real time to assess the potential output and/or impact of control decisions on a specific generator operating point. Furthermore, it may be used as reference against the actual turbine comparing actual and predicted operation in response to the operating conditions to act as a health monitor.

The turbine model TM can be implemented in a number of different environments/programming codes. Typically, it may be based on iterative solver routines to handle both thermal coupling and control algorithms. Where possible, reduced order models, look-up tables or functions (equations) are used to represent complex behaviors using suitable approximations and/or assumptions to ensure short computation times whilst maintaining a suitable level of accuracy.

The turbine model TM, as shown in FIG. 3, may be extended to include blade models or structural models of the turbine. Such a model can be used to represent any electrical drive/generator system beyond the wind turbine.

More detailed the turbine model TM includes the following sub-models:

A rotor model for modelling the rotor ROT by converting wind speed WS into a rotor/blade rotational speed RS and mechanical power $P_{mech}$ (i.e., input torque M).

An optional bearing model for modelling the bearing by accounting for non-ideal main bearings and hence power loss.

A generator model for modelling the generator GEN by considering the main mechanical to electrical energy conversion accounting for the torque capability, voltage production and losses incurred in conversion: This may be implemented by a numerical computation of the electromagnetic performance (e.g. Finite Element Analysis), an analytical model, or a hybrid of these which uses a Reduced Order Model (ROM) in which the generator performance is derived through a-priori numerical modelling and distilled into simpler functions or look-up tables. The generator model is also adapted to calculate losses incurred in the conversion such as winding copper losses and stator electrical steel iron losses. It accounts for control decisions.

A converter model for modelling the converter CON: In a direct drive permanent magnet generator the variable frequency output of the generator is interfaced with the fixed frequency grid via a power electronic converter (active rectifier—DC link—inverter) which allows for control of the generator operating conditions. The load dependent switching and conduction losses in the converter are accounted for.

A cable loss model for modelling the cables CAB by consideration of Ohmic losses in connections cables.

An auxiliary/ancillary loss model for modelling auxiliary/ancillary components AUX by accounting for power consumed by supporting services such as cooling fans, pumps and hydraulic control systems as these losses detract from the available power at the grid.

A transformer loss model for modelling the transformer TRF by accounting for Ohmic winding losses and core losses which are dependent on load conditions.

Thermal models of the generator GEN and the converter CON: The performance and losses of the above components are temperature dependent. For example, the resistance and hence copper losses produced by the stator electrical windings increase due to the copper resistivity dependence on temperature and the flux produced by a permanent magnet (the field source in the generator) varies due to changes in the material remanence with temperature. As the losses themselves increase component temperature the above loss models are calculated iteratively with the respective thermal model GTM, CTM. As with the generator model, this may be implemented by a Reduced Order model using parameters derived from numerical modelling e.g., CFD and Thermal FEA to create an equivalent circuit or lumped parameter network.

A number of maps $M_R$, $M_{T1}$ and $M_{T3}$ resulting from the turbine model TM is illustrated in the P-WS-diagram (power versus wind speed map PWM) of FIG. 2. In this diagram, a map $M_R$ of a wind turbine which is calculated based on nominal parameters and two maps $M_{T1}$ and $M_{T3}$ for turbines T1, T3 which are based on a bespoke turbine model and measurement values MVi of turbine sensors are illustrated. By way of example only, the maps $M_{T1}$ and $M_{T3}$ of the turbines T1, T3 show that (at least some of) the manufacturing tolerances of the characteristic values AG, MP, MDM, TC, CR are different from that of the nominal turbine resulting in an additional power P for a given speed WS and/or the temperatures are lower than those of the wind turbine with nominal parameters.

Based on their associated power versus wind speed maps control parameters CP can be derived for each individual turbine (either with or without a malfunction) which are used for controlling the wind turbines.

Figure 4:
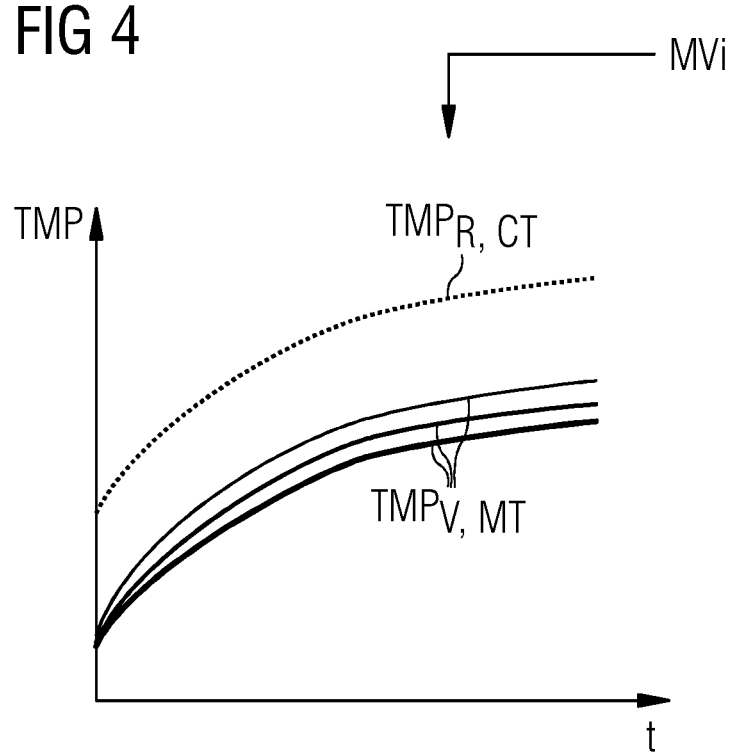
FIG. 4 illustrates exemplary temperature-time sequences of measured and determined temperatures.
Figure 4:
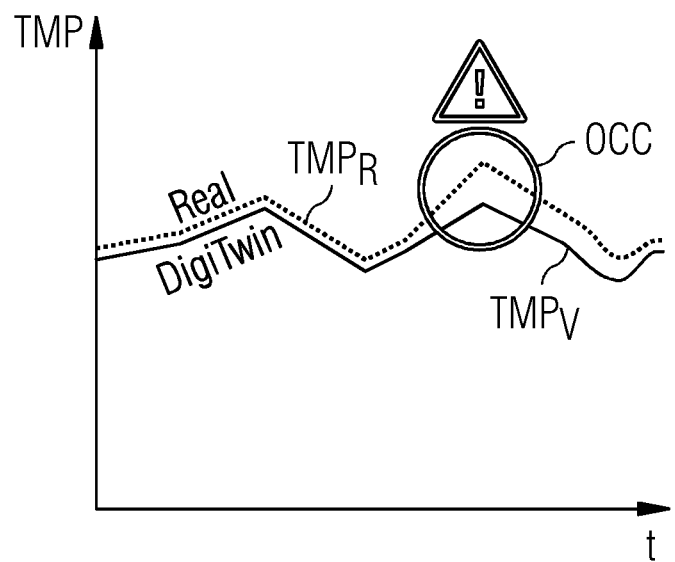

FIG. 4 illustrates two exemplary temperature-time sequences (TMP-t sequences) of a generator of a wind turbine. In the upper diagram of FIG. 4, a measured coil temperature is denoted with $TMP_{R,CT}$ and virtual magnet temperatures determined by the turbine model are denoted with $TMP_{V,MT}$. As can be seen the temporal development of the temperatures corresponds with each other, thereby having an offset due to different places in the generator.

In the lower diagram of FIG. 4, a measured temperature of a component, e.g., of the coil, is denoted with $TMP_R$ and the virtual magnet temperature of the component determined by the turbine model is denoted with $TMP_V$. As long as no problem arises, the temperatures correspond to each other. OCC denotes a problem which can be determined by a significant deviation of the two temperatures $TMP_R$ and $TMP_V$. Comparing measured and determined temperatures can be used for health monitoring and would provide an alarm/report that a potential problem/issue has occurred and corrective/preventative action can be taken.

The temperatures $TMP_R$ and $TMP_{VR,CT}$ represent measurement values MVi of turbine sensors, as described above.

The method described above may be used for wind turbines of a wind park which consists of a number n of turbines. It is to be understood, that the number of wind turbines may be arbitrary. The number of wind turbines may be one (1), i.e., the wind park corresponds to a single wind turbine. If the number of wind turbines is greater than one, the wind turbines are arranged in proximity to each other, to supply the total produced power at a single point to an energy grid.

By using a turbine-specific model and evaluating parameters and/or temperatures, the decision can be made as to what power level the turbine can be safely operated at. Thus, maximum power can be produced from the turbine within safety limits found in the turbine model. For example, if at one turbine one of the fans has stopped working, the thermal performance of the turbine model for that particular turbine can be modelled with one less fan. This will provide the new reference power requirements whilst remaining within the generator limitations and whilst also accounting for any specific characteristics of that turbine.

If this turbine would be operated at reduced power, however, without the above evaluation, the revised operating point could be underestimated so losing AEP or overestimated leading to extra faults, thermal overload (reducing the turbines overall lifetime) or damage.

Consideration of the impact of individual turbine manufacturing tolerances and virtual parameters and/or temperatures on the turbine performance and using them in a turbine model for each individual turbine allows for maximizing of an AEP through a wind park optimization by operating the turbines in an optimized manner, even in case of a component malfunction, at each location based on its individual turbine performance.

Comparing measured lifetime data in the form of historical data AD which are received from the processing unit in addition to the manufacturing data allows for a flexible exploitation of generous manufacturing margins to maximize AEP. In addition, the processing unit PU is able to incorporate health monitoring features through a comparison of measured parameters, such as component temperatures against those which may be predicted by the turbine model TM.

The comparison of physical turbine data can be made with the associated turbine model TM to monitor situations where the turbine may be underperforming as well as providing possible insight into reasons of an underperforming. The comparison can flag potential issues and call for servicing as well as providing learning for future turbine development.

Embodiments of the invention encompass the use of a turbine specific model in order to model certain scenarios, in particular within the turbine drive train, to extract power according to tolerable parameter and/or temperature limits. The turbine model introduces a level of model fidelity that allows these different scenarios to be modelled. This will increase wind park availability and allow strict availability minimum limits to be met.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for computer-implemented determination of control parameters of a turbine, the turbine being a wind turbine comprising a generator, the method comprising during real-time operation of the turbine:

receiving, in real time by an interface of a computer system that controls the real-time operation of the turbine, a data stream of one or more measurement values of turbine sensors;

determining, in real time by a processing unit of the computer system, at components in turbine places not equipped with turbine sensors, two or more virtual parameters and temperatures by a simulation of the operation of the turbine, the simulation being made with a given turbine model in which the one or more measurement values and one or more characteristic values of the turbine are used as input parameters;

deriving, in real time by the processing unit, the control parameters for the turbine from the two or more virtual parameters and temperatures; and controlling, by the processing unit of the computer system using the control parameters, the real-time operation of the turbine, wherein the two or more virtual parameters determined by the simulation and used to derive the control parameters used to control the real-time operation of the turbine comprise noise and vibrations.

2. The method according to claim 1, wherein the turbine model is a physical model which is based on a number of equations found by simulations.

3. The method according to claim 1, wherein the one or more characteristic values are retrieved from a database.

4. The method according to claim 1, wherein the one or more characteristic values are nominal parameters of the characteristic values and actual or achieved values within a manufacturing tolerance band of the characteristic values obtained by measurement.

5. The method according to claim 1, wherein the one or more characteristic values used as input parameters to the simulation include an airgap; a magnet performance; a magnet dimension; and a thermal conductivity.

6. The method according to claim 5, wherein the method comprises:
determining, by the turbine model using the processing unit and using the one or more characteristic values, whether the wind turbine is able to produce power without getting damaged.

7. The method according to claim 1, wherein the one or more measurement values comprise: a coil temperature; an ambient temperature; and a current load profile.

8. The method according to claim 1, wherein the turbine model uses time constants to determine a thermal spread from the place of one or more temperature sensors to the component or turbine components for which the virtual temperature is to be determined.

9. The method according to claim 1, wherein the turbine model is based on a heuristic approach.

10. The method according to claim 1, wherein as further input parameters of the turbine model historical turbine sensor data and operating conditions are processed for determining, by the processing unit, the virtual temperatures.

11. The method according to claim 1, wherein the turbine model considers a drive train comprising a rotor hub, a generator or motor, a converter and a transformer, of the turbine.

12. The method according to claim 1, wherein the turbine model considers blades, a gearbox, a nacelle, a tower, a cable, and a transformer of the wind turbine.

13. A computer readable non-transitory hardware storage device comprising software that, when executed by a processing unit of a computer system, perform the method of claim 1.

14. The method according to claim 1, wherein the two or more virtual parameters determined by the simulation and used to derive the control parameters used to control the real-time operation of the turbine further comprise component stress and component strain.

15. A system for computer-implemented determination of control parameters of a turbine during real-time operation of the turbine, the turbine being a wind turbine comprising a generator, the system comprising:
an interface configured to: receive in real time a data stream of one or more measurement values of turbine sensors, wherein a computer system that controls the real-time operation of the turbine comprises the interface; and
a processing unit configured to:
determine, in real time, at components in turbine places not equipped with turbine sensors, two or more virtual parameters and temperatures by a simulation of the operation of the turbine, the simulation being made with a given turbine model in which the one or more measurement values and one or more characteristic values of the turbine are used as input parameters;
derive, in real time, the control parameters for the turbine from the two or more virtual parameters and temperatures; and
control, using the control parameters, the real-time operation of the turbine,
wherein the two or more virtual parameters determined by the simulation and used to derive the control parameters used to control the real-time operation of the turbine comprise noise and vibrations.

16. The system according to claim 15, wherein the two or more virtual parameters determined by the simulation and used to derive the control parameters used to control the real-time operation of the turbine further comprise component stress and component strain.

* * * * *